US009484124B2

(12) United States Patent
Honda et al.

(10) Patent No.: US 9,484,124 B2
(45) Date of Patent: Nov. 1, 2016

(54) INSULATED ELECTRIC WIRE AND COIL USING SAME

(75) Inventors: Yuki Honda, Tokyo (JP); Shuta Nabeshima, Tokyo (JP); Takami Ushiwata, Tokyo (JP); Tomiya Abe, Tokyo (JP); Hideyuki Kikuchi, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 59 days.

(21) Appl. No.: 13/433,206

(22) Filed: Mar. 28, 2012

(65) Prior Publication Data

US 2013/0000951 A1 Jan. 3, 2013

(30) Foreign Application Priority Data

Jun. 30, 2011 (JP) ................................ 2011-146071

(51) Int. Cl.
*B32B 9/00* (2006.01)
*D02G 3/00* (2006.01)
(Continued)

(52) U.S. Cl.
CPC .............. *H01B 3/308* (2013.01); *H01B 3/306* (2013.01); *H01B 7/0216* (2013.01); *H01F 5/06* (2013.01)

(58) Field of Classification Search
CPC .......... C08L 79/08; H01B 3/00; H01B 3/306
See application file for complete search history.

(56) References Cited

U.S. PATENT DOCUMENTS 4,129,678 A * 12/1978 Seki et al. .................... 428/383
5,965,263 A 10/1999 Tatematsu et al.
(Continued)

FOREIGN PATENT DOCUMENTS

JP 63-221126 A 9/1988
JP 07-73743 A 3/1995
(Continued)

OTHER PUBLICATIONS

Japanese Office Action dated Jan. 20, 2015 with English Translation.
(Continued)

*Primary Examiner* — Peter Y Choi
*Assistant Examiner* — Christine Rea
(74) *Attorney, Agent, or Firm* — McGinn IP Law Group, PLLC.

(57) ABSTRACT

An insulated electric wire includes a conductor and an insulating coating provided around a perimeter of the conductor. The insulating coating includes a first insulating coating film around the perimeter of the conductor, the first insulating coating film being formed of a resin containing an imide structure in its molecule, and a second insulating coating film around a perimeter of the first insulating coating film, the second insulating coating film being formed of a polyimide resin comprising a repeat unit represented by Formula 1, and having an imide concentration of not less than 15% and not more than 36%, Formula 1

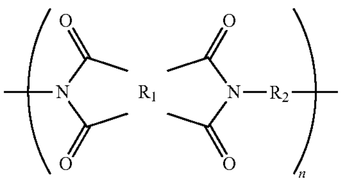

wherein $R_1$ is a tetravalent group derived from decarboxylation of an aromatic tetracarboxylic acid, and $R_2$ is a divalent group derived from deamination of an aromatic diamine.

19 Claims, 1 Drawing Sheet

(51) Int. Cl.

| | |
|---|---|
| ***C08G 69/26*** | (2006.01) |
| ***H01B 3/30*** | (2006.01) |
| *H01B 7/02* | (2006.01) |
| *H01F 5/06* | (2006.01) |

(56) References Cited

U.S. PATENT DOCUMENTS

| | | | | |
|---|---|---|---|---|
| 6,781,063 | B2 * | 8/2004 | Kim et al. | 174/149 R |
| 2009/0176961 | A1 | 7/2009 | Kikuchi et al. | |
| 2009/0202831 | A1 | 8/2009 | Honda et al. | |
| 2009/0301753 | A1 * | 12/2009 | Kikuchi et al. | 174/110 SR |
| 2010/0059248 | A1 * | 3/2010 | Honda et al. | 174/110 SR |
| 2010/0323161 | A1 * | 12/2010 | Chen et al. | 428/141 |
| 2011/0290528 | A1 * | 12/2011 | Honda et al. | 174/119 C |

FOREIGN PATENT DOCUMENTS

| | | | |
|---|---|---|---|
| JP | H 10-247422 | A | 9/1998 |
| JP | 2009-161683 | A | 7/2009 |
| JP | 2010-262789 | A | 11/2010 |
| JP | 2012-224697 | A | 11/2012 |
| JP | 2012-234625 | A | 11/2012 |

OTHER PUBLICATIONS

Chinese Office Action dated Jul. 22, 2015 with a partial English translation.
Japanese Office Action dated Oct. 13, 2015 with English translation.
Japanese Office Action dated Jun. 21, 2016 with an English translation.
Chinese Office Action dated Jul. 20, 2016 with an English translation.

* cited by examiner

INSULATED ELECTRIC WIRE AND COIL USING SAME

The present application is based on Japanese patent application No. 2011-146071 filed on Jun. 30, 2011, the entire contents of which are incorporated herein by reference.

BACKGROUND OF THE INVENTION

1. Field of the Invention

This invention relates to an insulated electric wire, and more particularly, to an insulated electric wire suitable for coils in electric devices such as motors, transformers and the like, and a coil using the insulated electric wire.

2. Description of the Related Art

Generally, insulated electric wires (enameled wires) have been widely used as coils in electric devices such as armatures, transformers and the like. These insulated electric wires are configured to comprise a metal conductor (conductor) having a cross section suitable for an application use or a shape of a coil (e.g. round or rectangular shape), and an insulating coating layer around a periphery of the conductor, which comprises a single layer or two or more layers of insulating coating film formed by applying around the conductor and baking an insulating varnish including a resin such as a polyimide, polyamide imide, polyester imide or the like dissolved in an organic solvent.

The electric devices such as armatures, transformers and the like are driven by inverter controlling. In such electric devices using inverter controlling, when the inverter surge (surge voltage) resulting from the inverter controlling is high, this inverter surge voltage may cause partial discharge in the insulated electric wires constituting the coils of the electric devices, and may degrade or damage the insulating coating film of the insulated electric wires.

As a method for preventing the insulating coating film from the degradation or damage due to the inverter surge voltage, insulated electric wires having a following configuration have been known. In such an insulated electric wire, an insulating coating film is formed by applying around a conductor and baking a polyamide-imide resin insulating varnish obtained by mixing an aromatic diisocyanate component having two or less aromatic rings with an aromatic imide prepolymer containing an aromatic diamine component having three or more aromatic rings and an acid component (refer to JP-A-2009-161683, for example). JP-A-2009-161683 describes that the use of such polyamide-imide resin insulating varnish provides the insulating coating film with a low relative permittivity, thereby provides the insulated electric wire with a high partial discharge inception voltage (PDIV).

SUMMARY OF THE INVENTION

In recent years, the motor miniaturization, motor power increasing and the like have been desired. In accordance with the above, the inverter surge voltage value resulting from the inverter controlling has been elevated. Therefore, the insulated electric wires are used in environments where the partial discharge tends to occur more than ever before. For this reason, it is desired that the recent insulated electric wire has a higher partial discharge inception voltage than the conventional insulated electric wires, so that no partial discharge itself will occur even if the inverter surge voltage value is elevated.

Also, for the motor miniaturization, high voltage motor driving and the like, it has been studied to increase the proportion of area occupied by the insulated electric wires constituting the coils. For this reason, the insulated electric wires constituting the coils are used in high temperature (e.g. 180 degree Celsius or higher) environments due to variation in environmental factors such as heat dissipation property degradation of the coils, high electric current flowing in the coils, and the like. Therefore, it is desired to provide the insulated electric wire in which the partial discharge itself hardly occurs in the high temperature environments, in order to prevent the insulating coating film from the degradation or damage due to the partial discharge even in the high temperature environments.

However, when the aforementioned polyamide imide resin insulating varnish was used, there were several cases in that a sufficient partial discharge inception voltage could not be realized in the high temperature environments.

Accordingly, it is an object of the present invention to provide an insulated electric wire, which overcomes the foregoing problem, and which has an insulating coating having a high partial discharge inception voltage even in high temperature environments. It is another object of the present invention to provide a coil using the insulated electric wire.

(1) According to one feature of the invention, an insulated electric wire comprises:

a conductor; and an insulating coating provided around a perimeter of the conductor, the insulating coating including:

a first insulating coating film around the perimeter of the conductor, the first insulating coating film being formed of a resin containing an imide structure in its molecule; and a second insulating coating film around a perimeter of the first insulating coating film, the second insulating coating film being formed of a polyimide resin comprising a repeat unit represented by Formula 1, and having an imide concentration of not less than 15% and not more than 36%, Formula 1

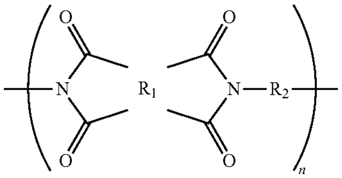

wherein $R_1$ is a tetravalent group derived from decarboxylation of an aromatic tetracarboxylic acid, and $R_2$ is a divalent group derived from deamination of an aromatic diamine.

The following modifications and changes can be made.

(i) A thickness of the second insulating coating film is preferably not less than 80% and less than 100% relative to a total thickness of the insulating coating.

(ii) The aromatic diamine for producing (i.e. as an ingredient for producing) $R_2$ in the Formula 1 may contain at least one of 2,2-bis[4-(4-aminophenoxy)phenyl]propane (BAPP), and 4,4'-bis(4-aminophenoxy)biphenyl.

(iii) The first insulating coating film may be made of a polyimide, polyamide-imide, or polyester imide.

(2) According to another feature of the invention, a coil comprises the insulated electric wire defined by (1).

(Points of the Invention)

According to one feature of the invention, the insulating coating includes a conductor and a first insulating coating around a perimeter of the conductor and which is formed of a resin containing an imide structure in its molecule, and a second insulating coating film around a perimeter of the first insulating coating film and which is formed of a polyimide resin comprising a repeat unit represented by Formula 1, and having an imide concentration of not less than 15% and not more than 36%. According to this structure, the insulated electric wire has a high partial discharge inception voltage, suppresses the melting of the coating films due to temperature rising of the resins of the coating films because of heat conduction from the conductor during welding, and has the insulating coating having a high partial discharge inception voltage at 180 degrees Celsius or higher.

According to another feature of the invention, it is possible to form the coil for constituting miniature and high power motors.

BRIEF DESCRIPTION OF THE DRAWINGS

The preferred embodiments according to the invention will be explained below referring to the drawings, wherein.

DETAILED DESCRIPTION OF THE PREFERRED EMBODIMENTS

Below is described one embodiment according to the invention, using the accompanying drawings.

(Structure of Insulated Electric Wire 10)

Figure 1:
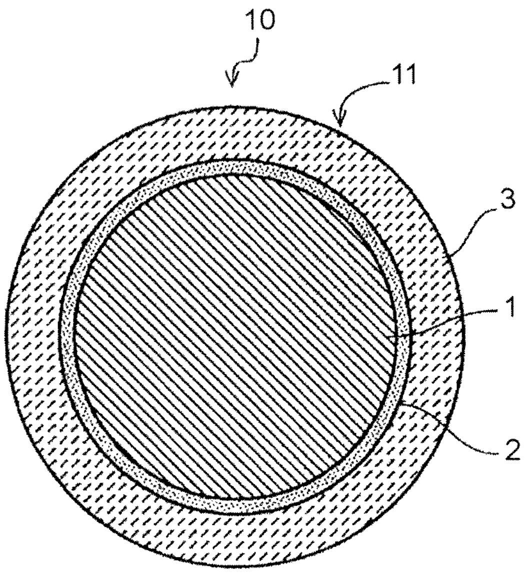
FIG. 1 is a cross sectional view showing an example of a structure of an insulated electric wire according to the invention.

FIG. 1 is a cross sectional view showing an example of a structure of an insulated electric wire 10 in this embodiment.

This insulated electric wire 10 includes a conductor 1, and an insulating coating 11 provided around a perimeter of the conductor 1. In the insulated electric wire 10, it is essential that the insulating coating 11 includes a first insulating coating film 2 provided around the perimeter of the conductor 1 and which is formed of a resin containing an imide structure in its molecule, and a second insulating coating film 3 around a perimeter of the first insulating coating film 2 and which is formed of a polyimide resin comprising a repeat unit represented by Formula 2, and having an imide concentration of not less than 15% and not more than 36%. Here, the "imide concentration" refers to "M1/M2" which is a concentration expressed in terms of the molecular mass M1 of the imide structure represented by Formula 3 divided by the molecular mass M2 of the chemical structure per one unit represented by Formula 4.

Formula 2

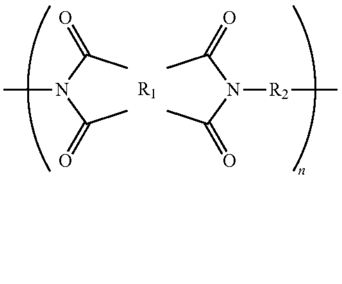

In Formula 2, $R_1$ is a tetravalent group derived from decarboxylation of an aromatic tetracarboxylic acid, and $R_2$ is a divalent group derived from deamination of an aromatic diamine.

Formula 3

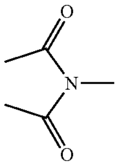

Formula 4

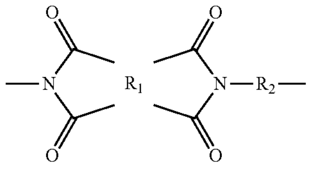

(First Insulating Coating Film 2 and Second Insulating Coating Film 3)

Next, the first insulating coating film 2 and the second insulating coating film 3 will be described in more detail.

(Insulating Coating 11 Having High Partial Discharge Inception Voltage)

The insulated electric wire 10 in this embodiment is characterized by having the insulating coating 11 including at least two layers of the first insulating coating film 2 formed of the resin containing the imide structure in its molecule provided around the perimeter of the conductor 1, and the second insulating coating film 3 provided directly around the first insulating coating film 2, and having the imide concentration of not less than 15% and not more than 36%, and having a high partial discharge inception voltage even in high temperature environments.

The imide concentration M1/M2 in the second insulating coating film 3 is preferably not less than 15% and not more than 36%. The insulating resin for the second insulating coating film 3 having the imide concentration of not less than 15% and not more than 36% is not particularly limited in its production method, but is preferred to synthesize by an imidization reaction between the aromatic tetracarboxylic dianhydride for producing (i.e. as an ingredient for producing) $R_1$, and the aromatic diamine for producing $R_2$.

As the aromatic tetracarboxylic dianhydride suitable for producing $R_1$ in Formula 2, there can be listed the following: pyromellitic dianhydride (PMDA); 4,4'-oxydiphtalic dianhydride (ODPA); 2,2-bis[4-(3,4-dicarboxyphenoxy)phenyl] propane dianhydride (BPADA), 3,3',4,4'-biphenyl tetracarboxylic dianhydride (BPDA) and the like, and there can be used one or a plurality of these aromatic tetracarboxylic dianhydrides.

On the other hand, as the aromatic diamine suitable for producing $R_2$ in Formula 2, there can be listed the following: 4,4'-diaminodiphenyl ether (ODA); 2,2-bis[4-(4-aminophenoxy)phenyl]propane (BAPP); 9,9-bis(4-aminophenyl)fluorene (FDA), 4,4'-bis(4-aminophenoxy)biphenyl and the like, and there can be used one or a plurality of these aromatic diamines.

In particular, in order to provide the second insulating coating film 3 whose imide concentration M1/M2 is not less than 15% and not more than 36%, at least one of the ingredients for producing $R_1$ and $R_2$ in the polyimide resin represented by Formula 2 preferably contains the aromatic tetracarboxylic dianhydride or the aromatic diamine having a molecular mass of not less than 300. It is more preferred that it may contain BAPP as the aromatic diamine having a molecular mass of not less than 300. Containing the BAPP as the aromatic diamine is effective in suppressing the decrease of heat resistance and reducing the imide concentration in the polyimide resin for the second insulating coating film 3 to not more than 36%. According to this structure, the second insulating coating film 3 has a high partial discharge inception voltage even in high temperature environments.

Also, in order to provide the second insulating coating film 3 having an imide concentration M1/M2 of not less than 15% and not more than 36%, the sum of the molecular mass of the aromatic tetracarboxylic dianhydride for producing $R_1$ and the molecular mass of the aromatic diamine for producing $R_2$ in the polyimide resin represented by Formula 2 is preferably not less than 500. For example, there is the polyimide resin containing PMDA as the aromatic tetracarboxylic dianhydride for producing $R_1$ and BAPP as the aromatic diamine for producing $R_2$.

The first insulating coating film 2 is formed by applying around the conductor 1 and baking the insulating varnish formed of the resin containing the imide structure in its molecule. As the constituent resin of this first insulating coating film 2 containing the imide structure in its molecule, e.g. a polyimide resin, polyester imide resin, polyamide imide resin or the like can be used.

When the first insulating coating film 2 is made of the polyimide resin, it is preferable to use the polyimide resin derived from an imidization reaction between the aromatic tetracarboxylic dianhydride and the aromatic diamine. For the constituent polyimide resin of this first insulating coating film 2, the sum of the molecular mass of the aromatic tetracarboxylic dianhydride and the molecular mass of the aromatic diamine is preferably less than 500, in order to gain the benefit of the invention more easily.

In particular, for the effective constituent polyimide resin of the first insulating coating film 2, the molecular mass of the aromatic tetracarboxylic dianhydride and the molecular mass of the aromatic diamine are both less than 250. In this case, the aromatic tetracarboxylic dianhydride and the aromatic diamine for composing the constituent polyimide resin of the first insulating coating film 2 may be selected from the aromatic tetracarboxylic dianhydrides and the aromatic diamines for composing the second insulating coating film 3. For example, the constituent polyimide resin of the first insulating coating film 2 is derived from a reaction between pyromellitic dianhydride (PMDA) for the aromatic tetracarboxylic dianhydride and 4,4'-diaminodiphenyl ether (ODA) for the aromatic diamine, or the like. In this case, the imide concentration is 36.6%.

In other words, the insulated electric wire 10 has the insulating coating 11 including the first insulating coating film 2 formed of the polyimide resin having the imide concentration greater than 36%, and the second insulating coating film 3 formed directly around the first insulating coating film 2 and formed of the polyimide resin having the imide concentration of not less than 15% and not more than 36%.

Also, when the first insulating coating film 2 is made of the polyamide imide resin, the polyamide imide resin used therefor may be derived from a reaction between an aromatic diisocyanate such as 4,4'-diphenyl methane diisocyanate (MDI) or the like and an acid made of a tricarboxylic anhydride such as trimellitic anhydride (TMA) or the like.

Also, when the first insulating coating film 2 is made of the polyester imide resin, the polyester imide resin used therefor may be derived from a reaction between the aromatic diamine made of 4,4'-diamino diphenyl methane (DAM) or the like and an acid made of trimellitic anhydride (TMA), dimethyl terephthalate (DMT) or the like and an alcohol made of tris(2-hydroxyethyl)isocyanurate (THEIC), glycerin (G), ethylene glycol (EG) or the like.

As with the polyimide resin, these constituent polyamide imide resin and polyester imide resin of the first insulating coating film 2 are preferred to have the imide concentration greater than 36%.

Also, the first insulating coating film 2 may contain an adhesion improver for improving the adhesion to the conductor 1.

In this insulating coating 11, in order to make its partial discharge inception voltage high, a thickness of the second insulating coating film 3 may be not less than 80% and less than 100% relative to a total thickness of the insulating coating 11. Incidentally, the total thickness of the insulating coating 11 is preferably 40 μm to 150 μm.

The insulated electric wire 10 in this embodiment has the insulating coating 11 as described above, so that the insulated electric wire 10 has the high partial discharge inception voltage. Further, it is possible to obtain the insulating coating 11 having the high partial discharge inception voltage at high temperatures (e.g. 180 degrees Celsius or higher). Also, when the conductors 1 at terminals of the insulated electric wires 10 are connected together by welding such as TIG (Tungsten Inert Gas) welding or the like, it is possible to prevent the problem of the insulating coatings 11 around the terminals peeling or bubbling due to being heated by the welding.

Figure 2:
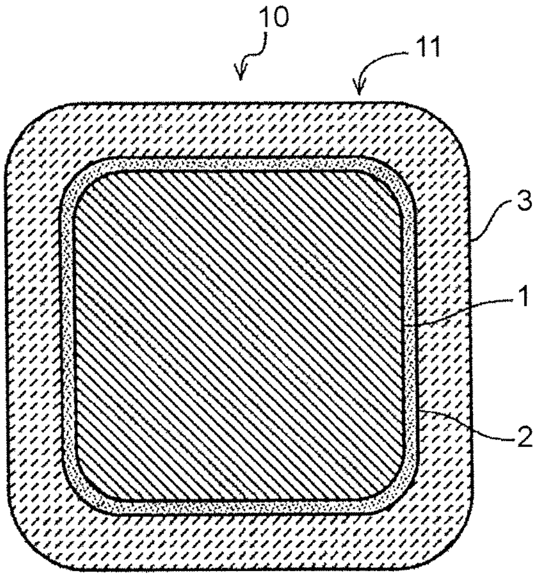
FIG. 2 is a cross sectional view showing another example of a structure of an insulated electric wire according to the invention.

The conductor 1 used in the insulated electric wire 10 is formed of a copper conductor, and primarily uses oxygen free copper or low oxygen copper. Incidentally, the conductor 1 is not limited to the copper conductor, but the conductor 1 plated with a metal such as nickel or the like around a perimeter of a copper may be used. Also, the conductor 1 to be used may be shaped to have a round cross section, a rectangular cross section or the like. Incidentally, the term "rectangular cross section" here includes a substantially rectangular cross section having round corners as shown in FIG. 2.

As described above, the insulated electric wire 10 according to the invention is produced by applying to the surface of the conductor 1 round or rectangular in cross section and baking the insulating varnish made of the polyimide, polyamide-imide, or polyester imide resin containing the imide structure in its molecule to form the first insulating coating film 2, and then applying to the surface of the first insulating coating film 2 and baking the insulating varnish made of the polyimide resin (Formula 2) to form the second insulating coating film 3 in which M1/M2 which is the imide concentration expressed in terms of the molecular mass M1 of the imide structure (Formula 3) divided by the molecular mass M2 of the chemical structure per one unit (Formula 4), is not less than 15% and not more than 36%. The partial discharge inception voltage at high temperatures of the insulating coating 11 including the first insulating coating film 2 formed of the resin containing the imide structure in its molecule is largely affected by the imide concentration in the second insulating coating film 3 formed around the first insulating coating film 2. If the imide concentration is less than 15%, the elastic modulus at the high temperatures will be greatly lowered, so that the partial discharge inception voltage at 180 degrees Celsius or higher will be greatly lowered, although it is possible to enhance the partial discharge inception voltage at a normal temperature of 23 degrees Celsius. If the imide concentration exceeds 36%, it will be hard to enhance the partial discharge inception voltage at a normal temperature of 25 degrees Celsius, since the imide concentration is high and the polarity is high.

Also, the insulated electric wire 10 in this embodiment may be formed with a lubricating insulating coating film for lubrication, an abrasion resistant insulating coating film for abrasion resistance or the like, around the perimeter of the insulating coating 11. These lubricating insulating coating film and abrasion resistant insulating coating film are preferably formed by applying and baking insulating varnishes therefor respectively.

In summary, the insulated electric wire 10 according to the invention has the conductor 1, and the insulating coating 11 provided around the perimeter of the conductor 1, and the insulating coating 11 includes the first insulating coating film 2 around the perimeter of the conductor and which is formed of the resin containing the imide structure in its molecule, and the second insulating coating film 3 around the perimeter of the first insulating coating film 2 and which is formed of the polyimide resin comprising the repeat unit represented by Formula 2, and having the imide concentration of not less than 15% and not more than 36%.

According to this structure, the insulated electric wire 10 has the high partial discharge inception voltage, suppresses the melting of the coating films 2 and 3 due to temperature rising of the resins of the coating films 2 and 3 because of the heat conduction from the conductor 1 during the welding, and has the insulating coating 11 having the high partial discharge inception voltage at 180 degrees Celsius or higher.

Further, the insulated electric wire 10 has the insulating coating 11 including the two layers of the first insulating coating film 2 formed around the perimeter of the conductor 1, and the second insulating coating film 3 formed directly around the first insulating coating film 2. According to this structure, the first insulating coating film 2 enhances the adhesion to the conductor 1 while the second insulating coating film 3 enhances the partial discharge inception voltage.

Still further, since the insulated electric wire 10 according to the invention has the insulating coating 11 having the high partial discharge inception voltage even in high temperature environments, the insulated electric wire 10 is suitable for forming coils for constituting the miniature and high power motors.

EXAMPLES

Examples of the invention and a comparative example are described below.

In the examples and the comparative example, polyimide resin varnishes and insulated electric wires are prepared as follows.

Example 1

In a flask with a stirrer, a reflux condenser tube, a nitrogen inlet tube, and a thermometer, equal moles of pyromellitic dianhydride (PMDA, molecular mass=218) and 4,4'-diaminodiphenyl ether (ODA, molecular mass=200) were combined, and N-methyl-2-pyrrolidone (NMP) was combined so that its solid content concentration was 15 mass %, followed by reaction at room temperature for 12 hours, to provide a resin varnish A.

Also, in a flask with a stirrer, a reflux condenser tube, a nitrogen inlet tube, and a thermometer, equal moles of 2,2-bis[4-(3,4-dicarboxyphenoxy)phenyl]propane dianhydride (BPADA, molecular mass=520) and 2,2-bis[4-(4-aminophenoxy)phenyl]propane (BAPP, molecular mass=410) were combined, and N-methyl-2-pyrrolidone (NMP) was combined so that its solid content concentration is 15 mass %, followed by reaction at room temperature for 12 hours, to provide a resin varnish (insulating varnish) 1.

The resin varnish A was applied to a periphery of a copper conductor and was baked to form a 0.002 mm thick insulating coating film therearound, and then the resin varnish 1 was repeatedly applied thereto and baked to form a 0.038 mm thick insulating coating film therearound, to provide an insulated electric wire in Example 1 having a total thickness of the insulating coating films of 0.040 mm.

Example 2

In a flask with a stirrer, a reflux condenser tube, a nitrogen inlet tube, and a thermometer, equal moles of 4,4'-oxydiphtalic dianhydride (ODPA, molecular mass=310) and 4,4'-diaminodiphenyl ether (ODA, molecular mass=200) were combined, and N-methyl-2-pyrrolidone (NMP) was combined so that its solid content concentration was 15 mass %, followed by reaction at room temperature for 12 hours, to provide a resin varnish (insulating varnish) 2.

The resin varnish A was applied to a periphery of a copper conductor and was baked to form a 0.002 mm thick insulating coating film therearound, and then the resin varnish 2 was repeatedly applied thereto and baked to form a 0.038 mm thick insulating coating film therearound, to provide an insulated electric wire in Example 2 having a total thickness of the insulating coating films of 0.040 mm.

Example 3

In a flask with a stirrer, a reflux condenser tube, a nitrogen inlet tube, and a thermometer, equal moles of pyromellitic dianhydride (PMDA, molecular mass=218) and 2,2-bis[4-(4-aminophenoxy)phenyl]propane (BAPP, molecular mass=410) were combined, and N-methyl-2-pyrrolidone (NMP) was combined so that its solid content concentration was 15 mass %, followed by reaction at room temperature for 12 hours, to provide a resin varnish (insulating varnish) 3.

The resin varnish A was applied to around a copper conductor and was baked to form a 0.002 mm thick insulating coating film therearound, and then the resin varnish 3 was repeatedly applied thereto and baked to form a 0.038 mm thick insulating coating film therearound, to provide an insulated electric wire in Example 3 having a total thickness of the insulating coating films of 0.040 mm.

Comparative Example 1

The resin varnish A was repeatedly applied to a periphery of a copper conductor and is baked, to provide an insulated electric wire in Comparative example 1 having a thickness of the insulating coating film of 0.040 mm.

The insulated electric wires in Examples 1 to 3 and Comparative example 1 and the resulting insulating varnishes used therein were evaluated as follows.

(Partial Discharge Inception Voltage)

The partial discharge inception voltage was measured in the following procedure: The resulting insulated electric wires were cut into 500 mm, and ten twisted pair insulated electric wire samples were made, and the insulating coating films thereof were removed in a length of 10 mm from an end thereof to form a terminated portion. A measurement was carried out by connecting an electrode to the terminated portion, at 25 degree Celsius and 50% relative humidity atmosphere, or at 180 degree Celsius and 220 degree Celsius atmospheres, with 50 Hz voltage being boosted at 10 to 30 V/s, to a voltage at which the twisted pair insulated electric wires have fifty 10 pC discharges per second. This was repeated three times, and the partial discharge inception voltage was an average of the three measurements.

(Weldability)

About 10 cm long test pieces taken from the resulting insulated electric wires were left unattended in a 120 degree Celsius constant temperature bath for 30 minutes, and were then cooled in a desiccator, to provide the test pieces in a dry state. Also, about 10 cm long test pieces taken were left unattended at 25 degree Celsius and 50% relative humidity constant temperature bath for 3 hours, to provide the test pieces in a moist state. Thereafter, the insulating coatings around terminal portions of these test pieces in the dry or moist state were removed in a length of about 5 mm from a tip thereof, and the terminal portions were each welded in 80 A electric current and 0.3 second conditions with a TIG (tungsten inert gas) welder. The appearances of the test pieces were then observed with an electron microscope. The weldability was accepted as "good" when there was no peeling and bubbling insulating coating, and was rejected as "poor" when there was seen a peeling and bubbling insulating coating.

Next, Table 1 shows evaluated results of the measurements of each kind.

around the perimeter of the conductor 1, the insulating coating 11 including the first insulating coating film 2 around the perimeter of the conductor 1 and which is formed of the resin containing the imide structure in its molecule, and the second insulating coating film 3 around the perimeter of the first insulating coating film 2 and which is formed of the polyimide resin comprising the repeat unit represented by Formula 2, and having the imide concentration of not less than 15% and not more than 36%.

Although the invention has been described, the invention according to claims is not to be limited by the above-mentioned embodiments and examples. Further, please note that not all combinations of the features described in the embodiments and the examples are not necessary to solve the problem of the invention.

What is claimed is:

1. An insulated electric wire, comprising:

a conductor; and an insulating coating provided around a perimeter of the conductor, the insulating coating including:

a first insulating coating film around the perimeter of the conductor, the first insulating coating film comprising a resin containing an imide structure in its molecule; and a second insulating coating film disposed directly on a perimeter of the first insulating coating film, the second insulating coating film comprising a polyimide resin comprising a repeat unit represented by

TABLE 1

| Item | | | Example 1 | Example 2 | Example 3 | Comparative example 1 |
|---|---|---|---|---|---|---|
| Coating structure | First insulating coating film | Type | Resin varnish A | Resin varnish A | Resin varnish A | Resin varnish A |
| | | Coating film thickness (mm) | 0.002 | 0.002 | 0.002 | 0.040 |
| | | Imide concentration (%) | 36.6 | 36.6 | 36.6 | 36.6 |
| | Second insulating coating film | Type | Resin varnish 1 | Resin varnish 2 | Resin varnish 3 | — |
| | | Coating film thickness (mm) | 0.038 | 0.038 | 0.038 | — |
| | | Imide concentration (%) | 15.7 | 29.5 | 23.6 | — |
| Partial discharge inception voltage (Vp) | 25° C.-50% RH | | 1080 | 1040 | 960 | 900 |
| | 180° C. | | 880 | 920 | 840 | 780 |
| | 220° C. | | 850 | 850 | 820 | 770 |
| Weldability | Dry state | | Good | Good | Good | Good |
| | Moist state | | Good | Good | Good | Poor |

As shown in Table 1, the insulated electric wires in Examples 1 to 3 were high in the partial discharge inception voltage at both the normal temperature and the high temperatures, and resulted in the good weldability as well. On the other hand, Comparative example 1 was low in the partial discharge inception voltage at the high temperatures, and also resulted in the poor weldability.

As clearly understood from the above, it is possible to provide the insulated electric wire 10 which has the high partial discharge inception voltage, suppresses the melting of the coating films 2 and 3 due to temperature rising of the resins of the coating films 2 and 3 because of the heat conduction from the conductor 1 during the welding, and has the insulating coating 11 having the high partial discharge inception voltage at 180 degrees Celsius or higher, by having the conductor 1, and the insulating coating 11 provided Formula 1, and having an imide concentration of not less than 15% and not more than 36%, Formula 1

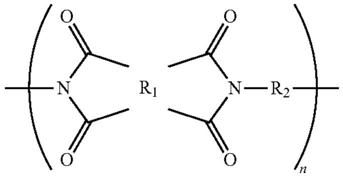

wherein $R_1$ is a tetravalent group derived from decarboxylation of an aromatic tetracarboxylic acid, and $R_2$ is a divalent group derived from deamination of an aromatic diamine, wherein the first insulating coating film and the second insulating coating film are formed by applying an insulating varnish and baking the applied insulating varnish, wherein the first insulating coating film comprises a polyimide resin having an imide concentration-greater than 36%, and wherein the polyimide resin of the second insulating coating film consists of an acid component consisting of pyromellitic dianhydride (PMDA) and 3,3',4,4'-biphenyl tetracarboxylic dianhydride (BPDA), and a diamine component consisting of 4,4'-bis(4-aminophenoxy)biphenyl (BAPB) and 4,4'-diaminodiphenyl ether (ODA).

2. The insulated electric wire according to claim 1, wherein a thickness of the second insulating coating film is not less than 80% and less than 100% relative to a total thickness of the insulating coating.

3. The insulated electric wire according to claim 1, wherein the aromatic diamine for producing $R_2$ in the Formula 1 contains at least 4,4'-bis(4-aminophenoxy)biphenyl.

4. The insulated electric wire according to claim 1, wherein the first insulating coating film comprises a polyimide, polyamide-imide, or polyester imide.

5. A coil, comprising the insulated electric wire according to claim 1.

6. The insulated electric wire according to claim 1, wherein the first insulating coating film is disposed directly on the perimeter of the conductor.

7. The insulated electric wire according to claim 1, wherein the aromatic diamine for producing $R_2$ in the Formula 1 comprises 4,4'-bis(4-aminophenoxy)biphenyl.

8. The insulated electric wire according to claim 1, wherein the first insulating coating film is disposed on a surface of the conductor.

9. The insulated electric wire according to claim 1, wherein the aromatic tetracarboxylic acid for producing $R_1$ in the Formula 1 is selected from the group consisting of pyromellitic dianhydride (PMDA), and 3,3',4,4'-biphenyl tetracarboxylic dianhydride (BPDA).

10. The insulated electric wire according to claim 1, wherein the aromatic diamine for producing $R_2$ in the Formula 1 is selected from the group consisting of 4,4'-bis(4-aminophenoxy)biphenyl, and 4,4'-diaminodiphenyl ether (ODA).

11. The insulated electric wire according to claim 1, wherein at least one of ingredients for producing $R_1$ and $R_2$ in the polyimide resin represented by the Formula 1 comprises the aromatic tetracarboxylic acid or the aromatic diamine having a molecular mass of at least 300.

12. The insulated electric wire according to claim 1, wherein the aromatic diamine has a molecular mass of at least 300.

13. The insulated electric wire according to claim 1, wherein a sum of a molecular mass of the aromatic tetracarboxylic acid for producing $R_1$ and a molecular mass of the aromatic diamine for producing $R_1$ in the polyimide resin represented by the Formula 1 is at least 500.

14. The insulated electric wire according to claim 1, wherein a molecular mass of the aromatic tetracarboxylic acid for producing $R_1$ is less than 250 and a molecular mass of the aromatic diamine for producing $R_1$ in the polyimide resin represented by the Formula 1 is less than 250.

15. The insulated electric wire according to claim 1, wherein a total thickness of the insulating coating is in a range from 40 μm to 150 μm.

16. The insulated electric wire according to claim 2, wherein the total thickness of the insulating coating is in a range from 40 μm to 150 μm.

17. The insulated electric wire according to claim 1, wherein aromatic tetracarboxylic dianhydride and aromatic diamine for composing the resin of the first insulating coating film is selected from the aromatic tetracarboxylic dianhydrides and aromatic diamines for composing the second insulating coating film.

18. The insulated electric wire according to claim 17, wherein the resin of the first insulating coating film is derived from a reaction between pyromellitic dianhydride (PMDA) for the aromatic tetracarboxylic dianhydrides and 4,4'-diaminodiphenyl ether (ODA) for aromatic diamines.

19. The insulated electric wire according to claim 1, wherein the resin of the first insulating coating film is derived from a reaction between pyromellitic dianhydride (PMDA) for aromatic tetracarboxylic dianhydride and 4,4'-diaminodiphenyl ether (ODA) for aromatic diamine.

* * * * *